United States Patent [19]

Key et al.

[11] 4,132,637
[45] Jan. 2, 1979

[54] OZONE DISINFECTION IN WASTE WATER TREATMENT WITH RECYCLING OF OZONATION OFF GAS

[75] Inventors: William P. Key, Lakewood; David C. Ihrig, Littleton; Darrell W. Monroe, Lakewood, all of Colo.

[73] Assignee: FMC Corporation, Chicago, Ill.

[21] Appl. No.: 719,835

[22] Filed: Sep. 2, 1976

[51] Int. Cl.² .................. C02C 1/06; C02B 1/38
[52] U.S. Cl. .................. 210/7; 210/18; 210/60; 210/63 Z; 210/195 S
[58] Field of Search ............... 210/7, 14, 15, 18, 63 Z, 210/192, 194, 195 S, 201, 205, 209, 218, 60; 55/33

[56] References Cited

U.S. PATENT DOCUMENTS

| | | | |
|---|---|---|---|
| 2,747,681 | 5/1956 | Schuftan et al. | 55/33 |
| 3,225,518 | 12/1965 | Skarstrom et al. | 55/33 |
| 3,660,277 | 5/1972 | McWhirter et al. | 210/63 Z |
| 3,732,163 | 5/1973 | Lapidot | 210/63 Z |
| 3,764,523 | 10/1973 | Stankewich | 210/15 |
| 3,945,918 | 3/1976 | Kirk | 210/63 Z |

Primary Examiner—Thomas G. Wyse
Attorney, Agent, or Firm—Dressler, Goldsmith, Clement, Gordon & Shore, Ltd.

[57] ABSTRACT

A method of recycling the off gas from an ozone disinfection step used with an activated sludge waste water treatment system, and apparatus for carrying out the method. The moisture is removed from a substantial portion but not all of the ozonation off gas, while the nitrogen and carbon dioxide contaminants that are contained in the off gas are left in it. The dried off gas is mixed with oxygen enriched gas from the original source, and the resulting mixture is delivered to the ozone generator for the production of more ozone. Another portion of the ozonation off gas is diverted upstream for introduction into the oxygen treatment facility of the activated sludge treatment plant. The drying of the ozonation off gas is preferably carried out by use of a two cycle self-purging dryer, with the portion of the ozonation off gas that is not delivered as a recycle component to the ozone generator utilized as the purge gas for the dryer before it is recycled upstream.

26 Claims, 11 Drawing Figures

OZONE DISINFECTION IN WASTE WATER TREATMENT WITH RECYCLING OF OZONATION OFF GAS

This invention relates to method and apparatus for ozone disinfection of waste water in conjunction with use of the known activated sludge method of treating waste water.

BACKGROUND OF THE INVENTION

In the conventional "activated sludge" process for the treatment of sewage, an aeration tank of substantial size is followed by a large settling and clarifying tank. The material being treated is aerated in the first tank for a period of time sufficient to achieve, through the action of oxygen and biological life such as aerobic bacteria and protozoa, desired biochemical removal of organic waste. In the settling and clarifying tank, as its name indicates, sludge settles to the lower portion of the tank and a relatively clear effluent rises to the top.

Sewage or other aqueous waste material containing solid particles suspended therein is introduced at the inlet of the aeration tank where, together with activated sludge that is continuously returned to the tank, it forms "mixed liquor." Mixed liquor contains not only aqueous waste material but also an active "biomass" that has been in contact with the aqueous waste material in the presence of oxygen for respiration. After it has remained in the aeration tank for a period of time, mixed liquor is continuously withdrawn from the outlet of the tank and delivered to the settling and clarifying tank.

In the settling and clarifying tank, a substantial portion of the suspended solids settles out as sludge (including as its volatile portion the biomass referred to above), and is withdrawn, either to be returned to the aeration tank as "activated sludge" or wasted as excess. The activated sludge contains aerobic biological life (such as bacteria and protozoa), and it is returned to the aeration tank in order to give this biological life repeated opportunities to metabolize the organic waste. Other material on which the aerobic bacteria and other biological life can feed, including synthesized cell material and soluble organic matter, is also returned from the settling and clarifying tank to the aeration tank as part of the activated sludge.

BIOLOGICAL OXIDATION AND NITRIFICATION

In order to promote the biochemical removal of organic waste by aerobic bacteria and other biological life as just described, it is necessary to provide sufficient oxygen to support the aerobic biological activity. To this end, in the aeration stage of the typical activated sludge process of sewage treatment as practiced for many years, bubbles of air have been introduced into the mixed liquor in the aeration tank.

Bubbles of air contain only about 23 percent by dry weight of oxygen, and for this reason it has become fairly common in recent years to increase the supply of oxygen provided for biological oxidation of the organic waste by introducing into the aqueous waste material bubbles of oxygen enriched gas containing as much as 90 or 95 percent of oxygen by weight. Although the production of gas containing a high percentage of oxygen is relatively expensive, the use of such oxygen enriched gas provides many advantages.

In a one-stage activated sludge sewage treatment plant as described, clarified supernatant liquid is drawn off from the top of the settling and clarifying tank and may if desired be discharged from the treatment plant as secondary effluent. In a typical two-stage activated sludge sewage treatment plant, the supernatant liquid from the settling and clarifying tank is introduced into a further oxygenation or oxygen treatment zone where nitrification — the conversion of dissolved ammonia to nitrate salts — takes place. The nitrification tank is in turn followed by a settling and clarifying tank from which settled activated sludge is returned to the nitrification tank, and from which supernatant liquid may if desired be discharged as plant effluent.

DISINFECTION BY OZONATION IN ADDITIONAL TREATMENT STEP

While the activated sludge process is one of the most effective and economical waste water treatment processes available today, it does not achieve complete purification of the aqueous waste material being treated. Thus, in a typical activated sludge sewage treatment plant of either the one-stage or two-stage type thus far described, organic waste ordinarily remains in the supernatant liquid flowing from the final settling and clarifying tank in an amount producing a fecal coli count of up to as much as $10^5$ for every 100 cc. of effluent.

As a practical matter, the effluent discharged from any such plant without further treatment is bound to contain a significant amount of oxidizable material representing Chemical Oxygen Demand (COD), including biodegradable organic matter representing residual Biological Oxygen Demand (BOD). While most of the BOD fed to an activated sludge treatment system is assimilated by the aerobic bacteria in the system, even in a well operated plant there will unavoidably be residual BOD in the effluent consisting of highly dispersed bacteria that escaped sedimentation and removal.

The bacteria include potentially pathogenic forms, and in addition the effluent will contain other pathogenic agents in the form of viruses. The discharge of these bacteria and viruses into public waters could promote the spread of communicable diseases, and additional treatment by disinfection is therefore ordinarily required by public health laws before plant effluents are discharged to the receiving waters. As an example, the regulations of the United States Environmental Protection Agency require that the fecal coli count of treated sewage effluent be no greater than 200 per 100 cc. of effluent. Such disinfection has conventionally been accomplished by the use of various chlorinating agents which have been found to have an effective bactericidal action.

The effectiveness of ozone as a general disinfecting agent has been known for a very long time. As one example, the well known bactericidal properties of ozone have led to the use of ozone, particularly in Europe, for the sterilization of drinking water.

In recent years the treatment of the effluent of sewage treatment plants with ozone — in the form of air or oxygen containing a few percent of ozone — has been widely suggested as an alternative to chlorination. Ozonation of sewage treatment plant effluent has been found to be very effective for disinfection of the effluent, but it can be quite expensive — a problem to which the present invention is directed.

OPERATION OF OZONE GENERATOR

Ozone generators are usually of the silent electric discharge type, which exhibit sharp variations in efficiency depending upon the oxygen concentration of the feed gas and the ozone concentration of the gas produced by the generator. With pure oxygen feed or a feed gas of about 90 to 95 percent oxygen, such generators usually operate most efficiently at an output of only about 1.5 to 2 percent ozone. One manufacturer of a commonly used brand of ozone generator has determined that with the indicated concentration of oxygen in the feed gas, the most efficient use of its generator produces an output of about 1.7 percent ozone. Production of as much as about 4 percent ozone is possible with currently available generators, but any concentrations above about 2 percent entail increasingly severe economic penalty.

If the gas used in the ozonation tank has an ozone concentration as low as is economically desirable in view of the efficiency pattern of the ozone generator just discussed, a great quantity of carrier gas must be used for introducing the ozone into the effluent being treated.

If air is used both as the source of oxygen for the generation of ozone and as the carrier gas for introduction of the ozone into the water in the ozonation process, this gas is of course available merely for the cost of its compression and mixing. However, the efficiency of an ozone generator increases in general as the percentage of oxygen in the feed gas increases. For this reason, to produce ozone from air requires a relatively large investment in ozone generators, and about twice the power that is required when pure oxygen or 90 to 95 percent pure oxygen is the feed gas.

INCREASE IN DISSOLVED OXYGEN

In addition, air contains only about 20 percent oxygen by volume, which hinders the carrying out of another step in the treatment of the effluent which can be advantageously combined with ozonation. This step is to increase the Dissolved Oxygen (DO) of the effluent, to seek to provide a quantity of dissolved oxygen which approaches or attains a value equivalent to the Biological Oxygen Demand or other Chemical Oxygen Demand still remaining in the effluent. The object is to provide enough oxygen to meet the residual oxygen demand in the plant effluent, and thereby prevent this residual BOD and other COD from contributing to an oxygen deficient condition in the receiving stream.

As a matter of fact, in some situations an additional amount of dissolved oxygen is desirable even above that which is required to satisfy the residual BOD and other COD of the effluent. This additional DO is desired in order to improve the quality of the receiving water above the level it would possess if the effluent were not being discharged into that body of water, in those situations in which the quality of the receiving water is likely to be adversely affected by pollution from sources other than the sewage system. Such a situation could obtain, for example, when there is an unusual runoff of rainwater, a substantial discharge of pollutants into the body of water upstream or downstream of the municipal boundaries, or unauthorized dumping or pollution within the municipality.

RECYCLING OF OZONE OFF GAS

For the reasons given, it is desirable to use a feed gas into the ozone generator for production of an ozone-containing oxygen enriched gas for treatment of the effluent from an activated sludge sewage treatment plant that is at least about 90 to 95 percent pure oxygen.

As has been pointed out above, a high level of oxygen in the feed gas for the ozone generator renders the operation of the generator more efficient. At the same time, this oxygen enriched gas acts not only as a carrier for the ozone but as a supply of oxygen available to increase the DO content of the plant effluent.

The high cost of oxygen enriched gas having an oxygen content of 90 percent or more has suggested to many persons skilled in sewage treatment the desirability of reusing the off gas from the ozonation process in the same manner that reuse of an off gas has often been turned to in the past to avoid wasting expensive chemical agents in many industrial chemical processes. Depending upon the circumstances, such past use has involved recycling the off gas from a given stage of a particular chemical process back into the same stage, or flowing the off gas to a downstream stage for use there, or diverting the off gas to an earlier, upstream stage for use there.

RECYCLING AFTER REMOVAL OF ALL CONTAMINANTS

Thus, it has been proposed by prior workers in the art of sewage treatment to recover the oxygen that remains undissolved in the excess oxygen enriched gas (commonly called "off gas") from the ozonation process, recirculate all this off gas back to the ozone generator, and from there flow it in the form of ozone-containing oxygen enriched gas once again back to the ozone contact tank. However, this off gas is not only saturated with water and therefore must be dried before being recirculated through the ozone generator, but it contains substantial quantities of nitrogen and carbon dioxide that are "stripped" by the oxygen enriched carrier gas from the effluent during the ozonation treatment. (Nitrogen is present in the aqueous waste material because it is unavoidably absorbed in quite large quantities from the atmosphere by that liquid as it enters and passes through the sewage treatment system, and carbon dioxide is present primarily as a by-product of the oxidation of carbonaceous material during treatment.)

A carrier gas that is very rich in oxygen — which is preferred, for the reasons given, for the carrier gas coming out of an ozone generator — is of course extremely low in nitrogen, carbon dioxide, and argon, all of which are present in much higher quantities in the normal mixture that constitutes air. Thus, when the carrier gas introduces its ozone into the aqueous waste material in the ozonation process, the low partial pressures of nitrogen, carbon dioxide, etc. in the carrier gas will cause it to strip from the liquid contents of the ozonation tank substantial quantities of these gases, and will thus increase the percentages of such contaminant gases in the off gas from the ozonation tank.

If these contaminants are not removed, they will seriously suppress the oxygen partial pressure in the feed gas to the ozone generator, and will greatly dilute the advantage of using a feed gas having a high oxygen content for the ozone generator, since the presence of these contaminants will necessarily reduce the efficiency of the generator. As the recycling of the carrier gas continues, the carrier gas strips more and more nitrogen and carbon dioxide contaminants from the aqueous waste material being treated, the oxygen content of the ozonation off gas introduced into the ozone generator becomes progressively lower and lower, and the efficiency of the ozone generator suffers correspondingly.

Because of the buildup of contaminants just described that results from recycling the off gas, or excess oxygen enriched gas, back to the ozone generator from the ozonation tank, this expedient for avoiding the wasting of costly oxygen-rich gas was employed prior to applicants's present invention only when the off gas from the ozonation stage could be recycled not only through a drying stage to remove moisture but all the way back through a purification stage, for removal of the nitrogen and carbon dioxide contaminants, as well. Examples of this approach are disclosed in Lee et al. U.S. Pat. Nos. 3,748,262 and 3,856,671. Unfortunately, the removal of nitrogen, carbon dioxide, and water from the off gas to make possible its recycling is very expensive, and therefore has generally been found to be impractical.

RECYCLING OF OZONE OFF GAS TO OXYGENATION TANK

To avoid the cost of removing these contaminants as described, it has been suggested that the off gas from the ozonation process be diverted upstream in the activated sludge sewage treatment plant to an oxygenation tank where the oxygen-rich off gas is effective in promoting the aerobic biological activity that is necessary to the biochemical removal of organic waste, and where the presence of substantial portions of nitrogen, carbon dioxide and water will have little or no adverse effect. When this expedient is adopted to avoid wasting expensive oxygen gas, the only feed gas supplied to the ozone generator has been externally supplied oxygen enriched gas that has not yet been introduced into the sewage treatment system. An example of a system of this type designed to avoid wasting expensive oxygen gas is provided by McWhirter et al U.S. Pat. No. 3,660,227.

A system of the type just described that channels the off gas from the ozonation tank upstream into the oxygenation stage of an activated sludge sewage treatment process does of course utilize a portion of the ozonation off gas, but at the same time it wastes a very large part of that oxygen-containing gas because with typical waste water the oxygen requirements for ozone disinfection and DO enrichment in the ozonation tank are much greater than the oxygen requirements for biological oxidation upstream in the activated sludge process. The only times when there is little or no waste of oxygen-containing ozonation off gas with use of the method and apparatus such as disclosed in the patent just mentioned are either when the BOD$_5$ of the aqueous waste material being treated is unusually high, or the disinfection requirement for ozone in the effluent from the oxygenation phase of the waste water system is unusually low.

In addition to wasting a large quantity of oxygen, a system of the type described tends to increase unduly the pumping capacity and power requirements for diffusing oxygen-containing gas into the upstream oxygenation tanks, because of the lower percentage of oxygen in the ozonation off gas than in the oxygen enriched gas from the original source. If the oxygen enriched gas from the original source contains about 95 percent oxygen but none of that gas is added as make-up gas to the ozonation off gas containing, say, about 84 percent oxygen, then the pumping capacity and power requirements will both be increased, in order to get the same amount of oxygen gas dispersed into the body of liquid being oxygenated, over what would be required if a portion of oxygen enriched gas from the original source were added to the ozonation off gas before it was introduced into the oxygenation tank.

ADVANTAGES OF THIS INVENTION

For the reasons just given, prior to the present invention it seemed impossible to recycle the off gas, or excess oxygen enriched gas depleted at least partially of its ozone and oxygen, from the ozone disinfection step to the biological oxidation stage upstream of the ozonation stage without wasting a very large and expensive quantity of oxygen gas and without increasing unduly the pumping capacity and power required to diffuse the oxygen enriched gas into the contents of the biological oxidation tank. It also seemed impossible to recycle ozonation off gas to the ozone generator without removing the nitrogen and carbon dioxide contaminants from the off gas by apparatus that was expensive both in terms of capital cost and operating cost. Surprisingly, the present invention has proved both these universally accepted assumptions to be incorrect.

In connection with this invention, it has been discovered that when aqueous waste material of typical BOD$_5$ and ozone disinfection demand is treated in an activated sludge system, a limited but nevertheless substantial fraction of the nitrogen- and carbon dioxide-containing off gas from the ozonation step can be recycled to the ozone generator without any of the expected deleterious effect on the operation of the ozone generator, while a substantial portion, and frequently all, of the remainder of the ozonation off gas can be successfully fed back upstream and introduced into the oxygen treatment part of the system. In many situations there is no waste of oxygen at all with the method and apparatus of this invention, and in most other common situations only a small portion of the oxygen introduced into the system overall is wasted.

By contrast, prior art systems involving return of the ozonation off gas to the ozone generator required the removal from the ozonation off gas, at considerable expense, of nitrogen and carbon dioxide contaminants. Moreover, under usual circumstances, the prior art systems returning off gas upstream to an oxygenation step wasted a very large portion of the oxygen-containing ozonation off gas, and thus required oxygen generation at a much higher and more expensive level; under the occasional optimum circumstances, such systems still required unduly expensive pumping equipment as well as power to operate the equipment.

The method and apparatus of this invention rely for their effectiveness on the discovery that, with the typical BOD$_5$ diurnal range of about 60 to 300 parts per million in the aqueous waste material treated in a municipal sewage treatment plant, and with an ozone disinfection demand of at least about 4 parts per million in the treated effluent from the oxygen treatment facility of the activated sludge sewage treatment plant, when a particular fraction of the ozonation off gas is diverted to the upstream treatment tanks, that fraction:

(1) Helps to meet the usual range of BOD$_5$ needs in the upstream oxygenation tanks;
(2) Does not unduly increase the pumping capacity or power requirements for introducing oxygen enriched gas into the upstream tanks;
(3) Does not present a large wasteful excess of oxygen to those upstream treatment stages;
(4) Happens to be about the amount that needs to be removed from the off gas recycled to the ozone generator to avoid undesirable buildup of nitrogen and carbon dioxide contaminants in the feed gas for the ozone generator; and (5) Leaves a fraction of the off gas for recycling to the ozone generator that, with typical equipment having a given maximum inherent efficiency for generating ozone, contributes substantially to providing the proper ozone dose and oxygen proportions for the combined ozone disinfection and DO enrichment step of this method.

In the preferred forms of the method and apparatus of this invention, in which a portion of the ozonation off gas is employed as a purge gas in a two cycle self-purging dryer to help in the removal of moisture from that portion of the off gas to be returned to the ozone generator (as, for example, when a heaterless dryer is used), there is the additional striking coincidence that the operating conditions in the drying step are such that the fraction of the ozonation off gas desirably employed as purge gas is roughly the same fraction that can be returned upstream to the oxygenation stage and still retain the advantages listed above.

The result of the use of this invention is a tremendous savings in cost. Very little, if any, oxygen needs to be vented to the atmosphere because of the coincidental balance just referred to between the oxygen requirements for biological oxidation in the upstream oxygenation stages on the one hand, and the oxygen requirements for the ozone disinfection and DO enrichment in the ozonation tank on the other hand. At the same time, the cost of the equipment required to handle the ozonation off gas that is diverted upstream is kept low because the apparatus and power requirements for pumps and diffusers for introducing the ozonation off gas into the upstream stage is kept at a relatively low figure.

SUMMARY OF INVENTION

The method of this invention is employed with the otherwise conventional treatment of aqueous waste material containing pathogenic agents such as bacteria and viruses by the known activated sludge method, with further oxygenation and disinfection of the resulting liquid effluent carried out by a known ozonation step.

In the present invention, a substantial portion but not all — usually at least about 30 percent — of the off gas from the ozonation step (in the form of excess oxygen enriched gas depleted at least partially of ozone and oxygen) has substantially all the moisture removed therefrom while the nitrogen and carbon dioxide contaminants that are contained in the off gas are left in it, the nitrogen- and carbon dioxide-containing ozonation off gas thus dried is mixed with oxygen enriched gas from the original source, and the mixture is delivered to the inlet of the ozone generator for production of more ozone. Another portion of the ozonation off gas is diverted upstream to the gas feed conduit of the oxygen treatment facility of the activated sludge treatment plant, where at least some of that portion of ozonation off gas is introduced into the aqueous material contained in the oxygen treatment facility.

Any portion of the ozonation off gas may be dried as it leaves the ozonation zone, so long as it provides sufficient dried off gas — usually between about 30 percent and about 90 percent of the total amount of ozonation off gas — for recycling from the ozonation tank to the ozone generator as just described. Improved results are obtained if the amount of the off gas recycled to the ozone generator falls between about 50 and about 80 percent of the total amount of off gas from the ozonation zone, and it is preferred that it be about 60 percent.

In one form of the method, a portion of the ozonation off gas diverted to the gas feed conduit of the upstream oxygen treatment facility is mixed with oxygen enriched gas delivered as make-up gas from the original source, and the mixture is introduced into the aqueous material in the oxygen treatment facility. Some of the ozonation off gas returned to the gas feed conduit of the oxygen treatment facility may if desired be vented directly to the atmosphere without being introduced into the oxygen treatment facility, while in another form of the method all of the ozonation off gas returned to the gas feed conduit is introduced into the aqueous material in the oxygen treatment facility.

A step may be included in which the amount of dissolved oxygen in the liquid contents of the oxygen treatment facility is sensed, and in response to that determination the amount of make-up gas delivered is adjusted or the amount of ozonation off gas vented directly to the atmosphere is adjusted.

The oxygen treatment facility of this method may be a single zone, either (1) an oxygenation zone in which only carbonaceous removal is effected, (2) a nitrification zone preceded by a zone for removal of carbonaceous material (such as a trickling filter or an aeration tank) without the use of any gas containing more than 23 percent oxygen by dry weight, or (3) a single zone in which the oxygenation tank and the gas transfer means contained therein are of sufficient capacity to bring about both carbonaceous removal (through biological oxidation) and nitrification. Or, if desired, the oxygen treatment facility may include both (1) an oxygenation zone and (2) a nitrification zone located downstream therefrom.

The drying step in which the moisture is removed from the ozonation off gas is preferably carried out by use of a two cycle self-purging dryer, with the portion of the ozonation off gas that is not delivered as a recycle component to the ozone generator utilized as the purge gas for the dryer. Good results are obtained when at least about 10 percent by dry weight of the ozonation gas is used as the purge gas for the dryer. Improved results are obtained when at least about 25 percent by dry weight of the ozonation off gas is used as the purge gas. Best results are obtained when approximately 40 percent by dry weight of the ozonation off gas is used as the purge gas.

The apparatus of this invention provides one means by which the method of this invention may be carried out.

BRIEF DESCRIPTION OF DRAWINGS

The method and apparatus of this invention will now be described by reference to the attached drawings, in which.

DETAILED DESCRIPTION OF INVENTION

The method and apparatus of this invention -- in which the off gas from the ozonation stage in an activated sludge waste water treatment plant is recycled both through the ozone generator and upstream into an oxygenation zone -- will now be described in detail by reference to four examples of the practice of the invention.

EXAMPLE 1

Figure 1:
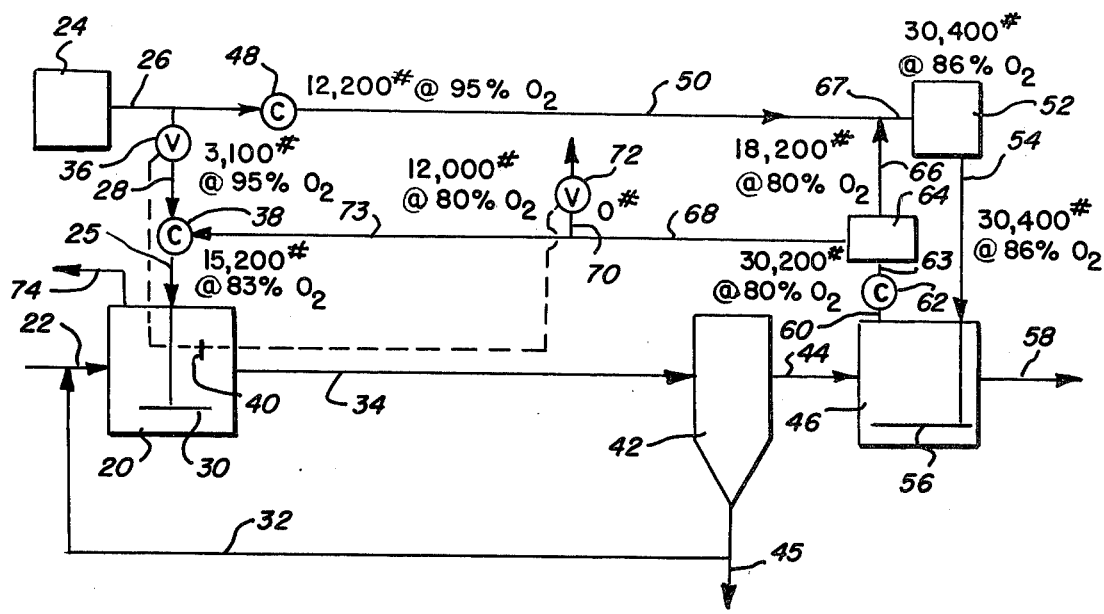
FIG. 1 is a schematic diagram of the aqueous waste material treatment apparatus of this invention involving a single oxygenation stage and showing average process conditions during 24 hours of operation according to the method of this invention.

Single-stage Embodiment of The Apparatus of This Invention With Process Conditions on Average Daily Basis A schematic diagram of the aqueous waste material treatment apparatus of this invention involving a single oxygenation stage is provided in FIG. 1. The apparatus shown is designed for carrying out treatment of the aqueous waste material by a conventional activated sludge method, and by additional treatment with ozone to disinfect the effluent from the prior stages of the system and further oxygenate that effluent to increase its dissolved oxygen content.

BIOLOGICAL OXIDATION

The aqueous waste material treated by the method and apparatus of this invention may have a $BOD_5$ of from about 60 parts per million to about 300 parts per million, and contain pathogenic agents such as bacteria and viruses in an amount creating an ozone disinfection demand in the effluent from the oxygen treatment facility of the activated sludge sewage treatment plant of at least about 4 parts per million. The aqueous waste material is introduced into oxygenation tank 20 through inlet 22. An oxygen enriched gas containing at least about 70 percent of oxygen by dry weight is provided by original source of oxygen 24 for flowing to feed gas conduit 25 for introduction into the aqueous waste material in tank 20 through gas diffusing means 30.

Introduction of the gas in this way through diffusion means 30 thoroughly mixes the aqueous waste material, the oxygen enriched gas, and the return activated sludge which is flowed through conduit 32 to inlet 22 of the tank. Mixed liquor in the form of liquid with suspended solids contained therein is formed, and flows from tank 20 through outlet conduit 34.

Oxygen enriched gas from source 24 flows through conduit 26, valve 36, conduit 28, compressor 38, and from there to feed gas conduit 25 and oxygenation tank 20. In the embodiment illustrated, dissolved oxygen sensing means 40 is positioned in oxygenation tank 20, and is operatively connected with valve 36. This valve, in response to the dissolved oxygen level sensed by sensor 40, automatically adjusts the amount of oxygen enriched gas introduced into tank 20 from original source 24.

Mixed liquor flows from oxygenation tank 20 through outlet conduit 34 to settling and clarifying tank 42. The mixed liquor is held in tank 42 to cause activated sludge to settle out onto the floor of that tank, while liquid effluent flows from outlet 44 of the tank. As already explained, at least a portion of the activated sludge that settles out in tank 42 is returned through conduit 32 to inlet 22 of oxygenation tank 20. If desired, another portion of activated sludge is wasted through conduit 45.

OZONATION AND INCREASE IN DISSOLVED OXYGEN

The liquid effluent that flows from settling and clarifying tank 42 through outlet conduit 44 enters ozonation tank 46 located downstream of oxygenation tank 20 and settling and clarifying tank 42, respectively. Ozone contact tank 46 has a gas-tight cover, for a purpose to be explained below.

Oxygen enriched gas flows from original source 24 through conduit 26, compressor 48, and conduuit 50 to be a part of the feed gas introduced into ozone generator 52. The oxygen enriched gas in the embodiment of FIG. 1 is 95 percent oxygen by dry weight. Best results are obtained with most ozone generators of conventional types when the feed gas for the generator is at least about 90 percent or 95 percent by dry weight of pure oxygen. The output of ozone generator 52 is an oxygen enriched gas containing at least 1 percent of ozone gas by dry weight. With a typical ozone generator in common commercial use, the inherent efficiency of the generator has been found to be greatest when the output of the generator is about 1.7 percent ozone by dry weight.

The ozone-containing oxygen enriched gas from ozone generator 52 flows through conduit 54 to ozonation tank 46, where it is introduced into the contents of that tank through diffusing means 56. Introduction of gas through diffusing means 56 thoroughly mixes the gas with the liquid contents of the ozonation tank to inactivate the pathogenic agents contained therein, and produce substantially disinfected water for removal as plant effluent through outlet conduit 58.

A portion of the oxygen contained in the output gas from ozone generator 52 is dissolved in the liquid contents of ozonation tank 46, which increases the dissolved oxygen content of the effluent that leaves the waste water treatment plant through outlet conduit 58. As explained above, this improvement in the dissolved oxygen content in the plant effluent is often desirable.

RECYCLING OF OZONATION OFF GAS TO OZONE GENERATOR

Excess oxygen enriched gas that has been depleted at least partially of its ozone and oxygen content is flowed as "off gas" from gas-tight ozonation tank 46 through conduit 60 to compressor 62. From here the off gas flows through conduit 63 to dryer 64, where substantially all the moisture vapor and entrained mositure is removed in this embodiment from at least about 30 percent by weight of the excess oxygen enriched gas from ozonation tank 46. This portion of the off gas is thus dried, while the nitrogen and carbon dioxide contained in the gas remains.

At least some of the dried excess nitrogen- and carbon dioxide-containing oxygen enriched gas from ozonation tank 46, but not all of that gas, flows from dryer 64 through conduit 66 to inlet 67 of ozone generator 52, where this dried off gas is mixed with oxygen enriched gas delivered from original oxygen source 24 through conduit 50. The mixed gas enters ozone generator 52 as feed gas for the generator, and the process described above continues.

It is usually desirable to remove any residual ozone gas contained in the off gas from ozonation tank 46 (as, for example, by reconverting it back to oxygen or by reacting the ozone with known catalytic materials) before the off gas flows through any other component such as compressor 62. The reason for this is the very corrosive effect of ozone on metal parts, especially in the presence of high moisture vapor. It is believed that the high pressure and temperature in compressor 62 may inherently reconvert any such residual ozone to oxygen as the off gas passes through the compressor. However, if desired, a conventional ozone destruct device may be included in conduit 60 to destroy any ozone remaining in the ozonation off gas before the gas enters compressor 62.

It is essential that the dried ozonation off gas introduced into ozone generator 52 through conduit 66 as a recycle component be a substantial portion, but not all, of the off gas that flows from ozonation tank 46 through conduit 60. The introduction as a recycle component into ozone generator 52 of a portion constituting between about 30 percent and about 90 percent by weight of the ozonation off gas from tank 46 produces satisfactory results in maintaining the efficiency of the ozone generator while avoiding unnecessary waste of expensive oxygen gas. Improved results are obtained when the recycle component to the ozone generator from the off gas of the ozonation tank constitutes between about 50 percent and about 80 percent by dry weight of the off gas from tank 46. For best results, it is preferred that this percentage be about 60 percent.

Surprisingly, as has been explained above, when the indicated portions of the off gas from ozonation tank 46 are employed as a recycle component introduced as a part of the feed gas for ozone generator 52, both undesirable buildup of contaminants in the form of nitrogen and carbon dioxide and unnecessary waste of expensive oxygen gas are avoided. At the same time, the expense of removal of the nitrogen and carbon dioxide contaminants, which is necessary in some prior art systems, is also avoided.

RECYCLING OF OZONATION OFF GAS TO OXYGENATION TANK

A further savings is effected with the method and apparatus of this invention by diverting to gas feed conduit 25 of oxygenation tank 20 through conduit 68 and compressor 38 at least a portion of the ozonation off gas from tank 46 that remains after the above described recycling of ozonation off gas to ozone generator 52. This portion of the ozonation off gas from tank 46 is thus made available for introduction into the aqueous material contained in oxygen treatment tank 20.

If desired, some or all of the off gas from ozonation tank 46 that flows through conduit 68 to oxygenation tank 20 may be routed around dryer 64. In addition, as will be explained below, when dryer 64 is a two-cycle self-purging dryer that uses a portion of its own dried output as purging gas to regenerate one-half of the dryer while the other half is in its gas drying cycle, the moisture-containing gas resulting from the purge of dryer 64 may be flowed through conduit 68 to tank 20.

Excess oxygen that remains undissolved in the aqueous material in oxygenation tank 20 is vented to the atmosphere from the top of tank 20 if it is an open top tank, or through escape conduit 74 if the tank is a closed top tank.

Provision is also made in the embodiment shown to avoid introduction of too much oxygen into tank 20. Specifically, conduit 70 branches off from conduit 68 to provide a venting path, through valve 72, in certain situations. It is usually not desired to permit the dissolved oxygen content of the mixed liquor and oxygenation tank 20 to rise above a certain value, and thus under some circumstances it will be desired to vent to the atmosphere without introduction into the contents of tank 20 a portion of the excess oxygen enriched gas from ozonation tank 46. Oxygen sensing means 40 in tank 20 is operatively connected with valve 72, to automatically open that valve to permit the venting of oxygen-containing gas in response to a predetermined level of dissolved oxygen as determined by sensor 40.

Oxygen sensing means 40 actuates both valve 36 (referred to above) and valve 72. When the dissolved oxygen level sensed by means 40 drops to a predetermined minimum value, valve 36 is opened wider to permit the flow of additional make-up oxygen into oxygenation tank 20 from oxygen source 24. When the dissolved oxygen level sensed by means 40 rises to a predetermined value above said predetermined minimum, valve 36 is closed somewhat to return to its former condition, and when the dissolved oxygen as sensed rises even more, to a predetermined maximum level, valve 36 is closed altogether and valve 72 is opened to vent some of the ozonation off gas to the atmosphere. The off gas that is not vented continues on through conduit 73 to gas feed conduit 25 for oxygenation tank 20. Valve 72 closes again when the dissolved oxygen sensed by means 40 drops below the predetermined maximum referred to.

AVERAGE DAILY CONSUMPTION OF OXYGEN

FIG. 1 indicates the dry weight of gases flowing through the respective conduits and components of the apparatus of this invention illustrated in that figure. Similarly, the percentage oxygen content in the gas flowing through the respective conduits is also indicated. The gas weights given are the total number of pounds required in the assumed situation during a complete day. Since the situation shown does not relate to any particular time during the day, the diurnal fluctuations in flow rate and $BOD_5$ that are experienced in a typical waste water treatment plant are of course not reflected in these figures.

The $BOD_5$ concentration for the aqueous waste material entering oxygenation tank 20 at inlet 22 has an average daily value of 150 mg./l. in FIG. 1. The ammonia nitrogen content of the aqueous waste material has an average of 15 mg./l. during the same 24-hour period. The ozone dosage required for disinfection of the contents of ozonation tank 46 is 6.66 parts per million. The efficiency of ozone generator 52 is 1.7 percent. The $BOD_5$ removal effected by the system shown is from about 87 to 92 percent, while the removal of ammonia nitrogen is negligible.

As will be seen from the gas weights and percentages of oxygen given in FIG. 1, under the conditions described no oxygen in the ozonation off gas is wasted to the atmosphere, but all of it is recycled either as feed gas to the generator 52 or as oxygen introduced into oxygenation tank 20 for biological oxidation of the mixed liquor contained there.

Oxygen enriched ozone-containing gas flows from ozone generator 52 to ozonation tank 46, where its oxygen content is reduced from 86 percent to 80 percent both by the dissolving of oxygen in the liquid contents of tank 46 and by the "stripping" of nitrogen and carbon dioxide from the contents of the tank. When a portion of the off gas from tank 46 is dried and recycled back to the inlet of ozone generator 52, where it is mixed with 95 percent oxygen from original oxygen source 24, oxygen enriched gas containing 86 percent oxygen results. Surprisingly, although it is known that best results are obtained with a feed gas of 90 to 95 percent pure oxygen into the ozone generator, the use of feed gas in the general range indicated has been found to be entirely satisfactory. As a result, as is seen, the recycle component of the ozone generator feed gas in the situation illustrated in FIG. 1 is not only equal to but not actually greater than the make-up component from original source 34.

Another important cost savings results from the fact that the gas which flows from ozonation tank 46 through conduit 68 to gas feed conduit 25 of oxygenation tank 20 as a recycle component provides more than three times as much oxygen as is provided by the make-up component that flows through conduit 28 from oxygen source 24. On balance, the added cost of pumping and diffusing into oxygenation tank 20 the mixture of gases containing 83 percent oxygen (resulting from the 80 percent recycle component and the 95 percent make-up component) instead of the 95 percent pure oxygen gas from original source 24 that would be introduced into tank 20 if no off gas were recycled upstream from the ozonation tank to tank 20, is greatly outweighed by the basic savings in oxygen when no ozonation off gas is vented through conduit 70 and valve 72.

The balancing of the recycling of off gas from ozonation tank 46 upstream to oxygenation tank 20 with the unexpectedly feasible recycling of nitrogen- and carbon-dioxide-containing off gas to ozone generator 52 combines to produce remarkable results with the method and apparatus of this invention. The percentage utilization of oxygen from original source 24 in the situation illustrated in FIG. 1 has been found to be about 91 percent. This percentage utilization is virtually the highest oxygen utilization that as a practical matter can be achieved, because of the impossibility of ever accomplishing complete dissolution of the oxygen in the aqueous waste material being treated.

COMPARISON WITH SINGLE-STAGE SYSTEM OF PRIOR ART UTILIZING RECYCLING OF OZONATION OFF GAS TO OXYGENATION STAGE ONLY

Figure 2:
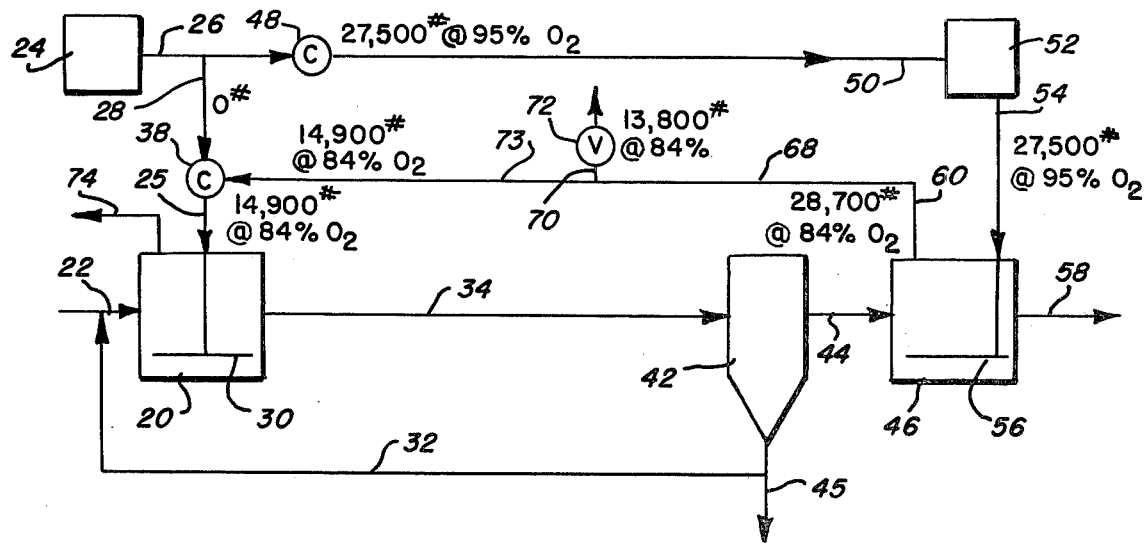
FIG. 2 is a similar schematic diagram of a prior art system in which all the off gas from the ozonation stage that is not vented to the atmosphere is recycled upstream to the oxygenation stage of the system.

The remarkable results achieved with the practice of this invention can also be appreciated by contrasting the aqueous waste material treatment method and apparatus illustrated in FIG. 1 with the prior art system illustrated in FIG. 2. In this prior art system, an effort is made to avoid wasting expensive oxygen gas by recycling as much off gas from the ozonation stage upstream to the oxygenation stage of the system as can be done without increasing too markedly the dissolved oxygen content of the mixed liquor in the oxygenation tank.

In FIG. 2, the same aqueous waste material is introduced into oxygenation tank 20 through inlet conduit 22 as in FIG. 1. Specifically, the aqueous waste material again has a $BOD_5$ concentration of 150 mg./l., an ammonia nitrogen concentration of 15 mg./l., and bacteria and viruses in an amount creating an ozone disinfection demand in the effluent from the oxygen treatment facility of the plant of approximately 6.66 mg./l.

The results in terms of treatment and disinfection of the aqueous waste material by the prior art system of FIG. 2 are substantially the same as the results with the method and apparatus of this invention illustrated in FIG. 1. In both cases, the $BOD_5$ removal is about 87 to 92 percent, and the ammonia nitrogen removal is negligible. However, a tremendous savings in the amount of oxygen consumed is effected by use of the method and apparatus of FIG. 1.

In the system of FIG. 2, an oxygen enriched gas is introduced, through compressor 38, gas feed conduit 25, and gas diffusing means 30, into the mixed liquor in oxygenation tank 20. The difference between the system shown in FIG. 1 and the prior art system in FIG. 2 is that in the latter system all the oxygen enriched gas introduced into tank 20 flows as off gas from ozonation tank 46, and none of the oxygen enriched gas flows (through intervening conduits 26 and 28) directly from original oxygen source 24.

As shown, liquid flows in FIG. 2 through conduit 34 to settling and clarifying tank 42. From tank 42, settled activated sludge is returned through conduit 32 to inlet 22 of tank 20. If desired, excess activated sludge may be wasted through outlet 45.

The effluent from settling and clarifying tank 42 flows through conduit 44 to ozonation tank 46. In ozone contact tank 46, oxygen enriched containing ozone is introduced through gas diffusing means 56. The ozone-containing gas is produced by ozone generator 52, and flows from there to ozonation tank 46 through conduit 54. Plant effluent flows out through conduit 58.

As will be noted, this prior art system reflects the belief that was universally held prior to applicants' present invention that it was impossible to recycle any off gas from an ozonation stage back to the ozone generator without removing the nitrogen and carbon dioxide contaminants that interfere with the operation of the generator. Thus the only feed gas introduced into generator 52 in the system of FIG. 2 is oxygen enriched gas containing about 95 percent pure oxygen that flows directly from original source 24, through conduit 26, compressor 48 and conduit 50.

As a result, as will be seen from the gas weights and oxygen percentages given in FIG. 2, under the indicated conditions the ozone generator of this prior art system requires a very large quantity of oxygen enriched gas to be fed continuously from original source 24, and in addition a very large quantity of oxygen is wasted by the venting of off gas from ozone contact tank 46 through conduits 60, 68 and 70 and valve 72. Moreover, the saving in the cost of pumping and diffusing the oxygen enriched gas introduced through gas feed conduit 25 into oxygenation tank 20 in the prior art system shown in FIG. 2 as compared to the cost with the system of this invention shown in FIG. 1 is negligible, since the percentage oxygen content of the gases introduced into the tank 20 through gas diffuser 30 is substantially the same in both cases.

EXAMPLE 2

Figure 3:
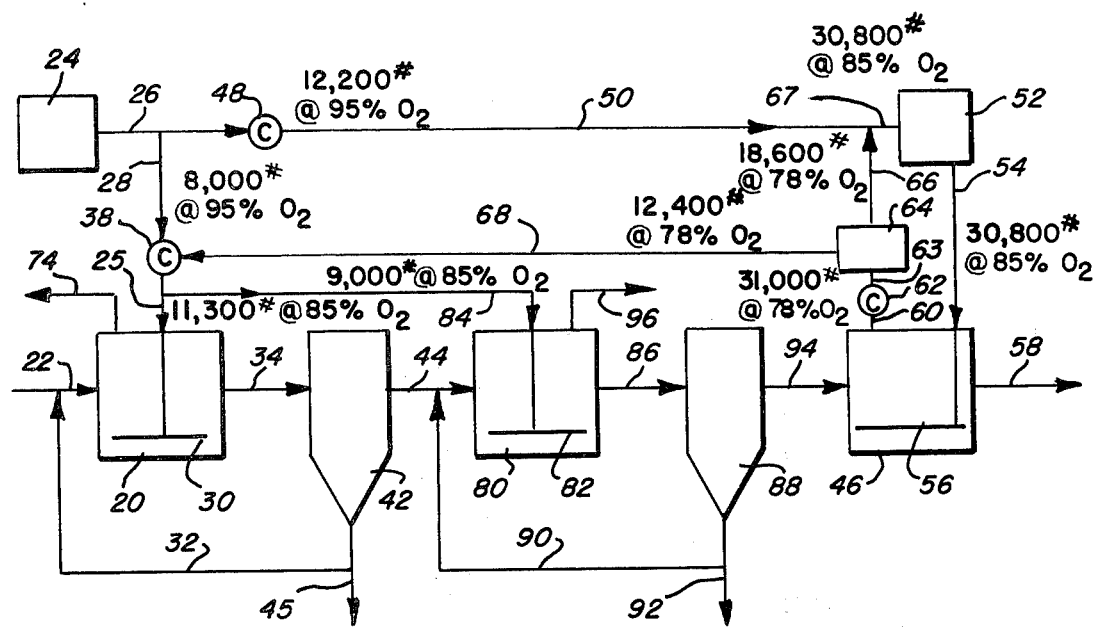
FIG. 3 is a schematic diagram of the aqueous waste material treatment apparatus of this invention involving two oxygenation stages and showing average process conditions during 24 hours of operation according to the method of this invention.

Two-stage Embodiment of The Apparatus of This Invention With Process Conditions on Average Daily Basis FIG. 3 is a schematic diagram of a two-stage aqueous waste material treatment plant according to the present invention. This system is basically similar to the system shown in FIG. 1, with the addition of a second tank in which oxygen enriched gas is introduced into the aqueous material being treated, and a clarifying and settling tank associated with that tank. Like components are identified with like numbers in FIGS. 1 and 3.

In the two-stage system shown in FIG. 3, the liquid effluent from settling and clarifying tank 42 flows through conduit 44 into nitrificaton tank 80, where oxygen enriched gas is introduced into the liquid contents of the tank through gas diffusing means 82 fed through conduit 84.

Liquid effluent from nitrification tank 80 flows through outlet conduit 86 to settling and clarifying tank 88. From tank 88 settled activated sludge is returned through conduit 90 to the inlet of nitrification tank 80. If desired, a portion of the activated sludge from tank 88 can be wasted through conduit 92.

The liquid effluent from clarifying and settling tank 88 flows through conduit 94 into ozonation tank 46. Here the effluent is mixed thoroughly with ozone-containing oxygen enriched gas introduced into the tank through diffuser 56. Disinfection of the plant effluent results.

In this embodiment of the present invention, a portion of the off gas from ozone contact tank 46 is flowed (through conduit 60, compressor 62, conduit 63, dryer 64, conduit 68, and compressor 38) not only to gas feed conduit 25 of oxygenation tank 20, but also to gas feed conduit 84 of nitrification tank 80. As with the single stage embodiment of FIG. 1, excess undissolved oxygen is vented to the atmosphere from the top of oxygenation tank 20 if it is an open top tank, or through outlet 74 if the tank is a closed top tank. Similarly, excess undissolved oxygen is vented either out the top of nitrification tank 80 or through escape outlet 96.

As is seen from the gas weights and oxygen percentages given in FIG. 3, the gas flowed from ozonation tank 46 to ozone generator 52 as a recycle component provides a substantially larger portion of the oxygen fed into the generator at inlet 67 than does the gas that is flowed through conduit 50 from original oxygen source 24 as a make-up component. This again provides, surprisingly, very effective operation of generator 52, and results in a marked savings by reducing the amount of new or make-up oxygen required in the feed gas for the ozone generator.

As is also shown in FIG. 3, no portion of the ozonation off gas is vented to the atmosphere in the situation shown, and a considerably greater weight of oxygen is provided for oxygenation tank 20 and nitrification tank 80 by the ozonation off gas than is provided by the make-up gas from original oxygen source 24.

In addition to avoiding the wasting of expensive oxygen, this embodiment of the method and apparatus of the present invention achieves more than a 95 percent level of $BOD_5$ removal and about a 98 percent level of ammonia nitrogen removal.

Figure 4:
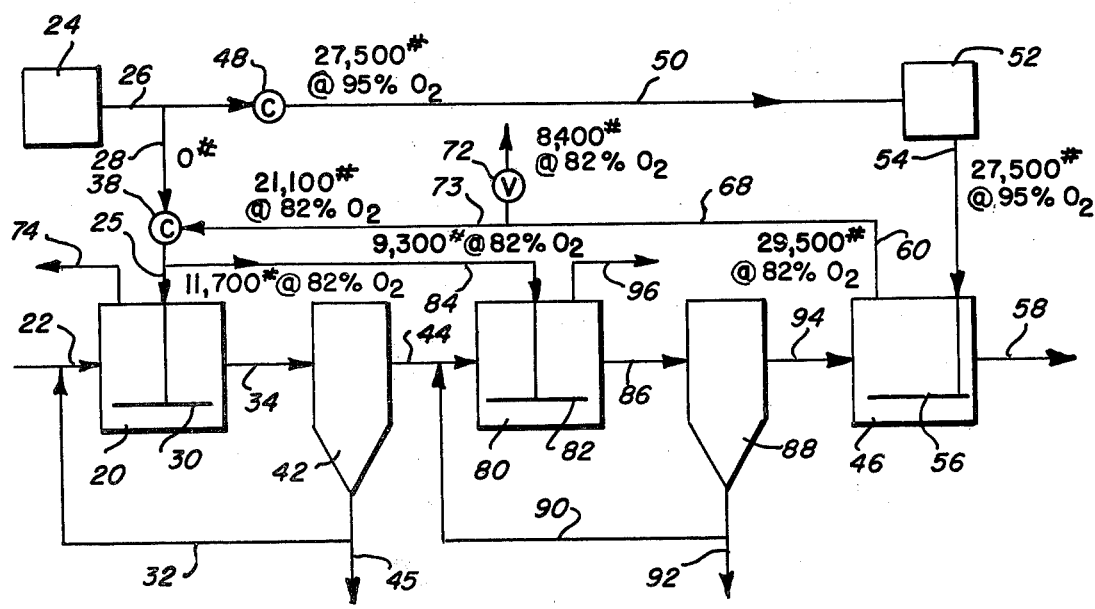
FIG. 4 is a schematic diagram similar to FIG. 3 that shows a prior art system in which all the off gas from the ozonation stage that is not vented to the atmosphere is recycled upstream to the oxygenation stages.

Comparison With Two-stage System of Prior Art Utilizing Recycling of Ozonation Off Gas to Oxygenation Stage Only FIG. 4 is a schematic diagram of a prior art system in which it is sought to avoid wasting expensive oxygen gas by recycling the off gas from the ozonation tank, but only upstream to the oxygenation stage. The two-stage system shown in FIG. 4 is the same as the two-stage system shown in FIG. 3, with the important exception that off gas from ozonation contact tank 46 is not returned to ozone generator 52. Instead, the only recycling utilized in the apparatus of FIG. 4 is through conduit 60 and 68 and compressor 38 to gas feed conduits 25 and 84 of oxygenation tank 20 and nitrification tank 80, respectively.

The aqueous waste material introduced into the system of FIG. 4 has the same characteristics as the material treated by the system of FIG. 3. That is to say, the $BOD_5$ concentration, ammonia nitrogen concentration, and ozone dosage required are the same with the material treated in both FIGS. 3 and 4. The final results achieved in the plant effluent are also the same, with a $BOD_5$ removal of 95 percent and an ammonia nitrogen removal of 98 percent.

The important difference between the system of the present invention illustrated in FIG. 3 and the prior art system illustrated in FIG. 4 is that a large quantity of oxygen is wasted by venting to the atmosphere in the prior art system, and therefore a very much larger quantity of oxygen enriched gas must be provided from original source of oxygen 24 during the 24-hour period to which the data given in FIG. 4 relates.

As a result, a very much lower percentage utilization of oxygen is achieved in the system of FIG. 4 than in the system of FIG. 3. Of the oxygen provided during the 24-hour indicated period by original source of oxygen 24, only 67 percent is utilized with the method and apparatus of FIG. 4. When this is compared with the 91 percent oxygen utilization achieved by the method and apparatus of this invention illustrated in FIG. 3, the importance of the present invention is made abundantly clear.

EXAMPLE 3

Single-stage Embodiment of The Apparatus of This Invention With Process Conditions Reflecting Diurnal Variations in Waste Material and Inflow Rate The importance of the present invention can be further understood by examining the utilization of the method and apparatus of the invention for treatment of aqueous waste material of a kind typically received in a municipal sewage treatment plant, with diurnal variations in both the $BOD_5$ concentration of the waste water being treated and its inflow rate.

Typical Aqueous Waste Material In Municipal Sewage Treatment Plant

FIG. 3-2 in the *Technology Transfer* bulletin issued in 1974 by the United States Environmental Protection Agency entitled *Process Design Manual for Upgrading Existing Wastewater Treatment Plants* provides an example of raw waste water flow and $BOD_5$ concentration, with diurnal variations, for a typical waste water treatment plant. The figure from the EPA bulletin referred to gives hourly information on the raw $BOD_5$ concentration and the inflow for a plant receiving an average flow of about 4.3 million gallons per day.

Figure 5:
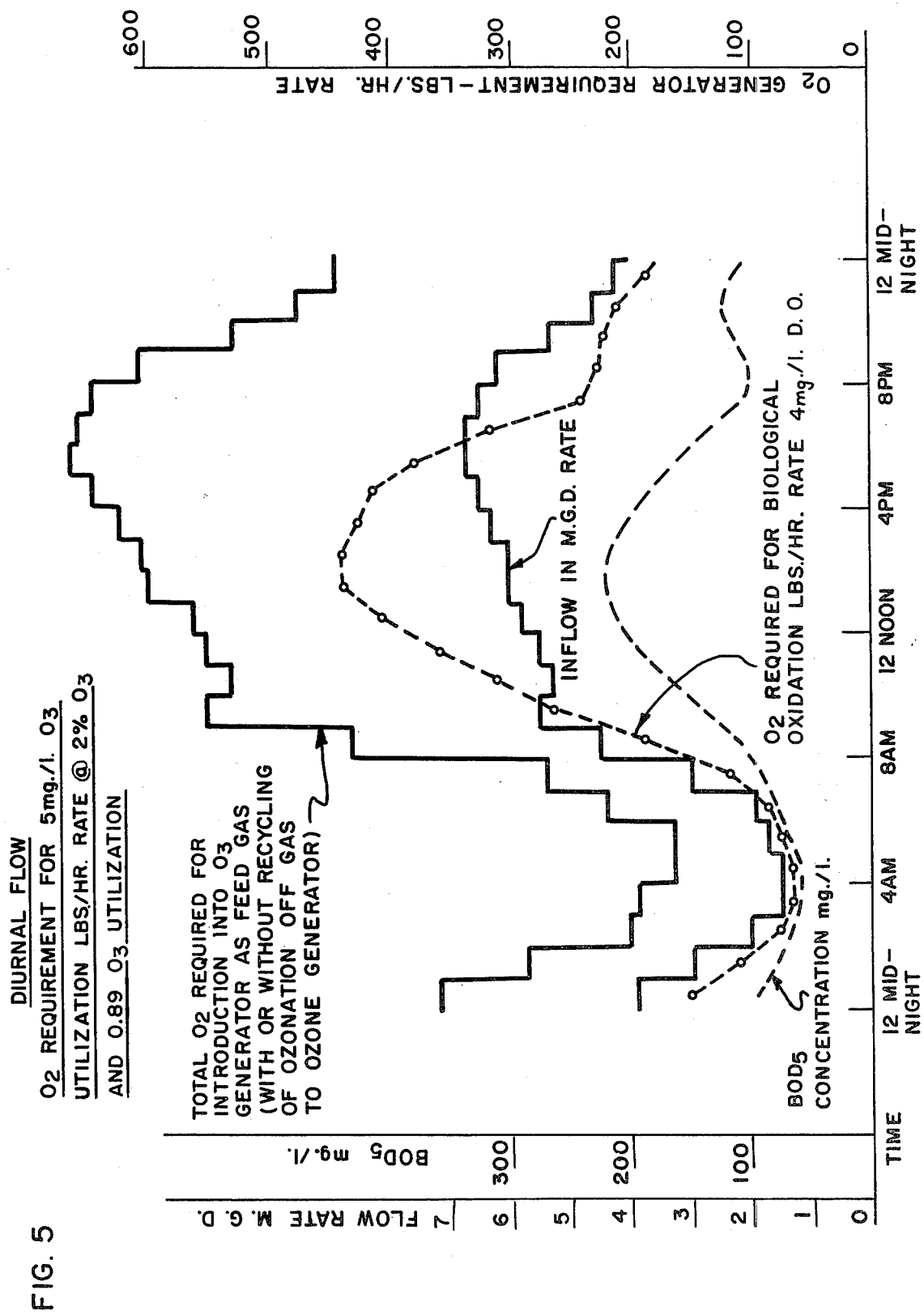
FIG. 5 is a graph of raw waste water flow and $BOD_5$ concentration at one hour intervals during a 24-hour period, without equalization of flow, in a typical single-stage sewage treatment plant, and shows the hourly requirements of oxygen for both biological treatment and introduction of oxygen into the ozone generator as a feed gas.

The graph of FIG. 5, showing the oxygen requirements under the conditions specified, was prepared from the EPA figure referred to. Since a typical treatment plant would incorporate primary treatment for removal of gross solids and some $BOD_5$, the value shown for $BOD_5$ concentration in EPA FIG. 3-2 was reduced in the preparation of FIG. 5 of the present application by 25 percent. This is in accord with the suggestions in the same EPA *Technology Transfer* bulletin in the section thereof regarding primary treatment.

As explained above under the heading "Advantages of This Invention," the method and apparatus of this invention rely for their effectiveness on the discovery of some remarkable coincidences between various operating conditions of the present system. The indicated coincidences are all the more surprising because there is no necessary relationship at a given time between the oxygen required for biological oxidation or treatment of the waste water, and the oxygen required to produce the ozone for final disinfection of the plant effluent. The oxygen requirements for biological oxidation are determined by the $BOD_5$ concentration of the aqueous waste material being treated, and the hydraulic flow into the oxygenation tank. The ozone requirements are determined by the desired ozone dosage in mg./l., and the hydraulic flow through the ozonation tank.

In computing the oxygen requirements for biological oxidation and ozonation as shown in FIG. 5 (as well as in FIGS. 6 through 9 below), an oxygenation tank with a retention period of 1.75 hours on the basis of the average inflow of 4.3 mgd (as in the EPA bulletin) and a final settling tank with 2.5 hours of retention time was assumed, both of these assumptions being made in accordance with standard engineering practice. The assumption is also made that the flow through oxygenation and final settling follows the "plug flow" configuration.

In FIG. 5, the $BOD_5$ concentration in mg./l., (derived from the above mentioned EPA FIGS. 3-2 and reduced as explained above) is shown by the lower dashed curve, and the inflow at the indicated rates in terms of millions of gallons per day is shown by the lower bar graph (converted to a bar graph, for convenience, from the same EPA FIGS. 3-2).

The oxygen requirements for $BOD_5$ removal and for the maintenance of 4 mg./l. of dissolved oxygen in the oxygenation tank (in accordance with standard engineering practice) were computed from the information given in the $BOD_5$ and inflow rate curves, and the resulting information was ploted to form the upper dashed curve. This is the quantity of oxygen that flows into oxygenation tank 20 through feed gas conduit 25 in FIG. 1.

The oxygen requirements for producing ozone to permit utilization of 5 mg./l. of ozone in the ozonation tank were then computed from the information in the inflow rate curve, assuming 89 percent ozone transfer into the liquid medium, and production of 2 percent ozone from the oxygen supplied to the ozone generator (both in accordance with standard engineering practice), and the resulting information was plotted to form the upper bar graph. This is the quantity of oxygen that flows into ozone generator 52 through inlet 67, and out through conduit 54, in FIG. 1. Some of this oxygen, in the form of carrier gas for the ozone, is available to increase the dissolved oxygen content of the effluent from the ozonation tank.

The total oxygen required on an hourly basis for biological oxidation and for introduction into the ozone generator as feed gas if there was no recycling at all from the ozonation tank — and thus all the oxygen requirements for the system were met by oxygen from the original source — would be the sum of the upper dashed line graph and the upper bar graph.

OXYGEN REQUIRED FOR SINGLE-STAGE EMBODIMENT OF THIS INVENTION

Figure 6:
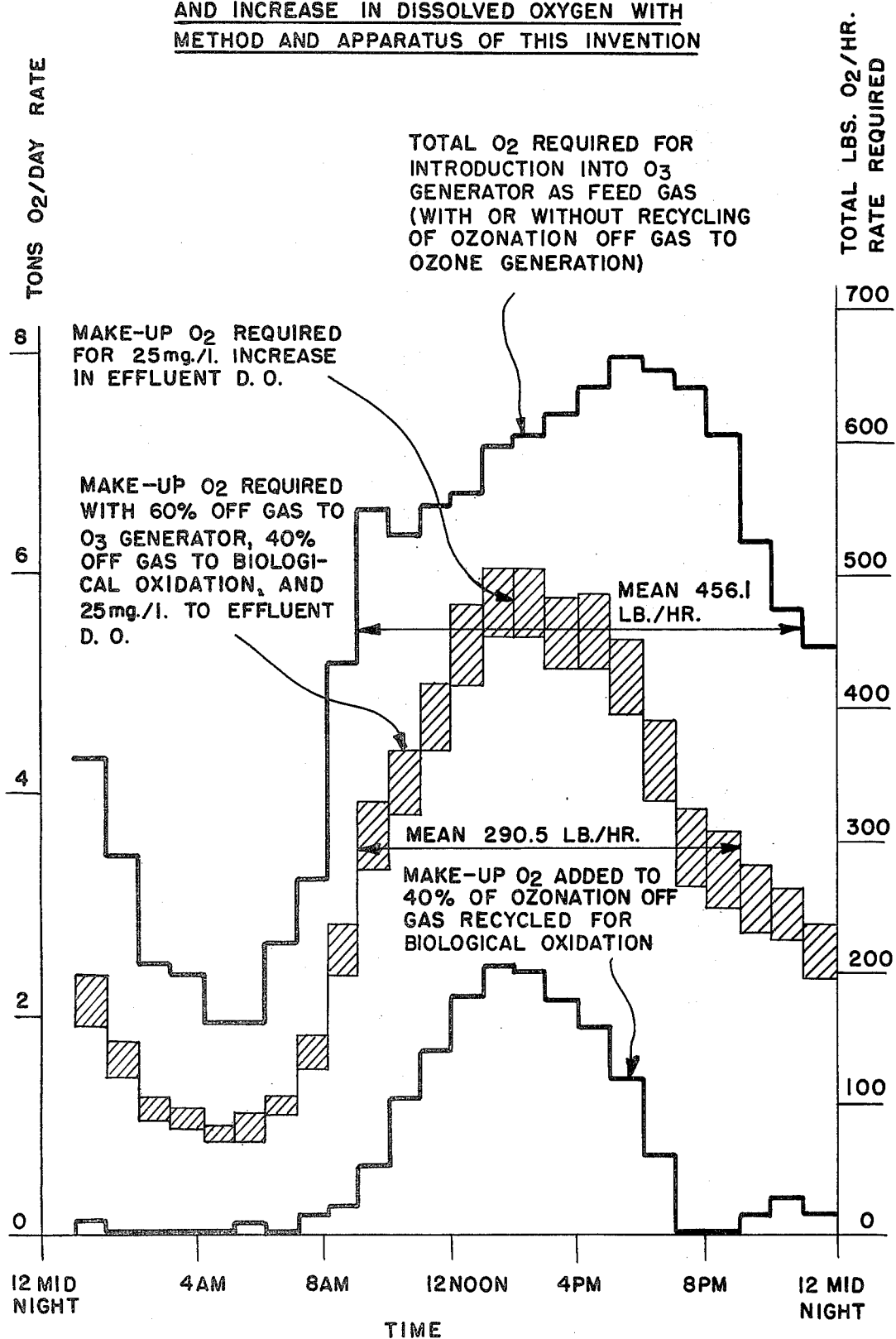
FIG. 6 is a bar graph showing the hourly oxygen requirements from the original oxygen source for biological oxidation followed by ozone treatment and further increase of dissolved oxygen in a typical single-stage sewage treatment plant employing the method and apparatus of this invention with the typical operating conditions illustrated in FIG. 5.

The graph of FIG. 6 shows the oxygen supply requirements for biological oxidation, ozone generation, and increased dissolved oxygen when the method and apparatus of this invention are used in the situation, with diurnal variations, that is illustrated in FIG. 5. The information given in the graphs of FIG. 6 is for a system in which 60 percent of the off gas from the ozonation tank is recycled to the ozone generator, and the remainder of the off gas is recycled upstream to the oxygenation tank.

The upper bar graph in FIG. 6 (which will be seen to be the same as the upper bar graph in FIG. 5) shows the total amount of oxygen required in the feed gas for the ozone generator, with an ozone utilization of 5 mg./l., whether or not any of that oxygen is a recycle component in the form of off gas from the ozonation tank. The feed gas into the ozone generator is utilized to produce ozone for disinfection, to provide additional oxygen (in the form of the ozone carrier gas) in order to increase the disolved oxygen content of the plant effluent, and finally to help provide oxygen (in the form of ozonation off gas) for the necessary biological oxidation if it is recycled upstream to the oxygenation tank — as, for example, through conduit 73 in the system of either FIG. 1 or FIG. 2. In the system of FIG. 1, part of the oxygen represented by the upper bar graph of FIG. 6 flows to ozone generator 52 through conduit 50 and part through conduit 66. In the system of FIG. 2, all of the oxygen represented by the upper bar graph of FIG. 6 flows to the ozone generator through conduit 50.

The middle, composite bar graph shows the total amount of oxygen required in the situation depicted in FIG. 5 from the original source (which is added as make-up gas to the recycled ozonation off gas going to both the ozone generator and the oxygenation tank) when the recycling of the method and apparatus of this invention is employed. In this figure, 60 percent of the off gas from the ozonation tank is recycled to the ozone generator and 40 percent upstream to the oxygenation tank. In this middle bar graph, the shaded portion at the top of each bar represents the amount of oxygen required from original source 24 in FIG. 1 to achieve 25 mg./l. of increase in the dissolved oxygen content of the plant effluent. The larger, bottom portion of each bar represents the amount of make-up oxygen required from original source 24 in FIG. 1 both to bring about the necessary biological oxidation in the oxygenation tank and to maintain the desired output of ozone in the ozone generator. The amount of gas that this middle, composite bar graph represents is the quantity that flows through conduit 26 — or the sum of what flows through conduits 50 and 28, respectively — in FIG. 1.

The bottom bar graph shows the oxygen required from the original source of oxygen as make-up gas to be added to the 40 percent of the ozonation off gas that is recycled upstream to the oxygenation stage in this example of the method of this invention. This quantity of oxygen is what flows through conduit 28 in the apparatus of FIG. 1.

Since the middle bar graph represents the flow of make-up oxygen through both conduits 28 and 50, the difference between the bottom bar graph and the middle bar graph is seen to represent what flows through conduit 50 in FIG. 1.

The important difference that should be noted between bar graphs in FIG. 6 is the difference between the middle bar graph, which as explained above represents the total make-up oxygen that flows from the original source when this invention is used, and the upper graph, which represents the make-up oxygen required when the prior art system of FIG. 2 is used. This difference represents the savings in make-up oxygen that is effected through this invention. For the particular plant conditions represented by FIGS. 5 and 6, the average quantities of make-up oxygen represented by the upper and middle bar graphs are 456.1 lbs./hr. and 290.5 lbs./hr., respectively. In this situation the present invention saves oxygen, in other words, at the rate of about 166 lbs./hr., or almost 2 tons of oxygen per day.

It follows that if apparatus is installed to generate sufficient oxygen on an hourly basis to meet the peak hourly demand with both the system of this invention to which FIGS. 1 and 6 refer and the prior art system to which FIG. 2 refers, the prior art system would require an oxygen generator of about 2 tons per day greater capacity than the system of this invention would require. In other words, practicing the present invention would mean a savings in operating cost, at an estimated power requirement of 20 kilowatts per ton per day of capacity installed, of approximately 960 kilowatt-hours each day.

One reason for this marked savings in cost is seen from FIG. 6 to be that when the system of the present invention is employed, in the periods from 1:00 A.M. to 5:00 A.M., 6:00 A.M. to 7:00 A.M., and 7:00 P.M. to 9:00 P.M. no fresh or make-up oxygen at all needs to be added from the original source (through conduit 28 in FIG. 1) for biological oxidation, since the recycled 40 percent of the ozonation off gas supplies sufficient oxygen for biological oxidation during these periods. Another reason, of course, is the wholly unexpected feasibility of recycling a substantial portion (in this example, 60 percent) of nitrogen- and carbon dioxide-containing ozonation off gas to the ozone generator.

COMPARISON WITH OXYGEN REQUIRED FOR SINGLE-STAGE EMBODIMENT OF PRIOR ART SYSTEM

Figure 7:
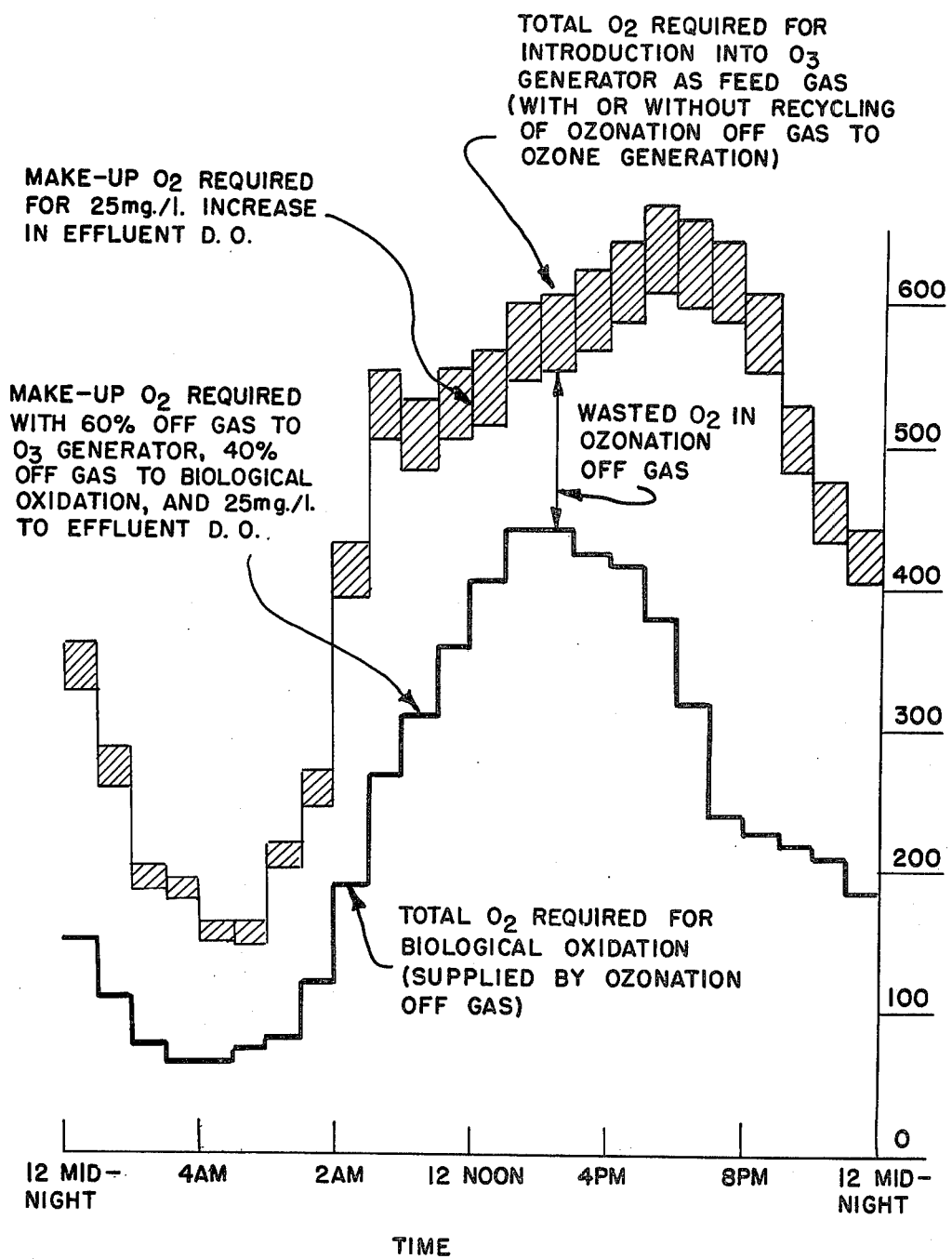
FIG. 7 is a similar bar graph for the same sewage treatment plant employing the prior art system schematically illustrated in FIG. 2.

FIG. 7 shows the oxygen supply requirements for biological oxidation, ozone generation, and increase in dissolved oxygen when a single-stage system of the prior art such as illustrated in FIG. 2 is used in the situation illustrated in FIG. 5.

In FIG. 7 the upper, composite bar graph shows the oxygen requirements for ozone generator feed gas and (in the shaded portion) for increase by 25 mg./l. of the dissolved oxygen content of the plant effluent, both of which requirements must under this prior art system be met by the oxygen from the original source. (This upper bar graph will be seen to be the same as the upper bar graph in both FIGS. 5 and 6.)

The lower bar graph shows the oxygen required for biological oxidation, which is supplied by the off gas from the ozonation tank in the system of FIG. 2. Since none of the ozonation off gas is recycled to the ozone generator and all the requirements for ozone generator feed gas must be met out of oxygen from the original source, it is seen that in each hour indicated on the graph of FIG. 7, the difference between (a) the hourly requirements of oxygen represented by the bottom, unshaded portion of the upper, composite bar graph and (b) the hourly requirements of oxgyen represented by the lower bar graph is totally wasted oxygen which must be vented to the atmosphere.

EXAMPLE 4

Single-stage Embodiment of The Apparatus of This Invention With Equalization of Flow Rate The method and apparatus of this invention is also useful in the treatment of typical aqueous waste material that is received in a municipal sewage treatment plant and stored in an equalization tank to smooth out or equalize the flow of aqueous waste material through the treatment plant over the 24-hour period of any given day.

Typical Aqueous Waste Material In A Municipal Sewage Treatment Plant With Equalized Or Constant Flow FIG. 3–4 is the *Technology Transfer* bulletin issued in 1974 by the United States Environmental Protection Agency referred to above provides an example of typical raw waste water flow and BOD$_5$ variation in a typical municipal sewage treatment plant in which the flow rate is equalized for a full day. FIG. 3–4 shows a resulting constant flow rate of about 4.3 million gallons per day, with hourly information on the raw BOD$_5$ concentration of the material passing through the treatment plant.

Figure 8:
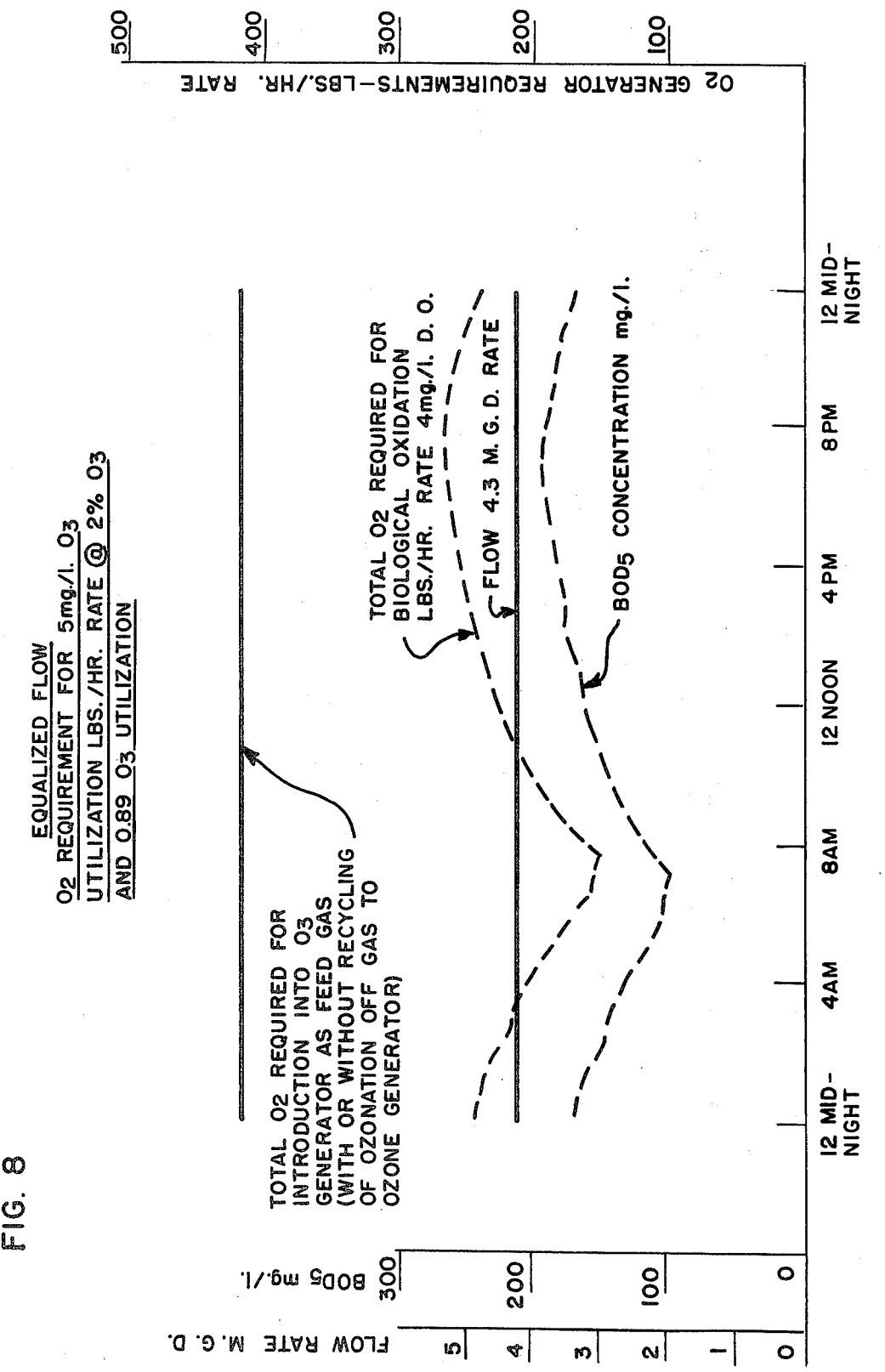
FIG. 8 is a graph of raw waste water flow and $BOD_5$ concentration at one hour intervals during a 24-hour period, assuming equalization of flow, in a typical single-stage sewage treatment plant, and shows the hourly requirements of oxygen for biological oxidation and for introduction of oxygen into the ozone generator as a feed gas, for both the method and apparatus of this invention and the prior art system schematically illustrated in FIG. 2.

The graph of FIG. 8, showing the oxygen requirements under the conditions specified, was prerared from the EPA figure referred to. Here, as with the preparation of FIG. 5, the BOD$_5$ concentration values were reduced by 25 percent on the assumption that the treatment plant includes a primary treatment step for removable of gross solids and some BOD$_5$.

The BOD$_5$ concentration in mg./l. is shown by the bottom dashed curve in FIG. 5. The inflow in terms of millions of gallons per day is shown by the bottom straight line, which represents the equalized flow explained above.

The oxygen requirements for $BOD_5$ removal and for the maintenance of 4 mg./l. of dissolved oxygen in the oxygenation tank were computed from the information given in the $BOD_5$ and inflow curve just described, and the resulting information was plotted to form the upper dashed curve. The oxygen requirements for producing ozone to permit utilization of 5 mg./l. of ozone in the ozonation tank were computed from the information in the flow rate curve, assuming 89 percent ozone transfer into the liquid medium, and production of 2 percent ozone from the oxygen supply to the ozone generator. The total oxygen required for biological oxidation and for introduction into the ozone generator as feed gas was then computed, and plotted as indicated by the upper, straight line graph.

Figure 9:
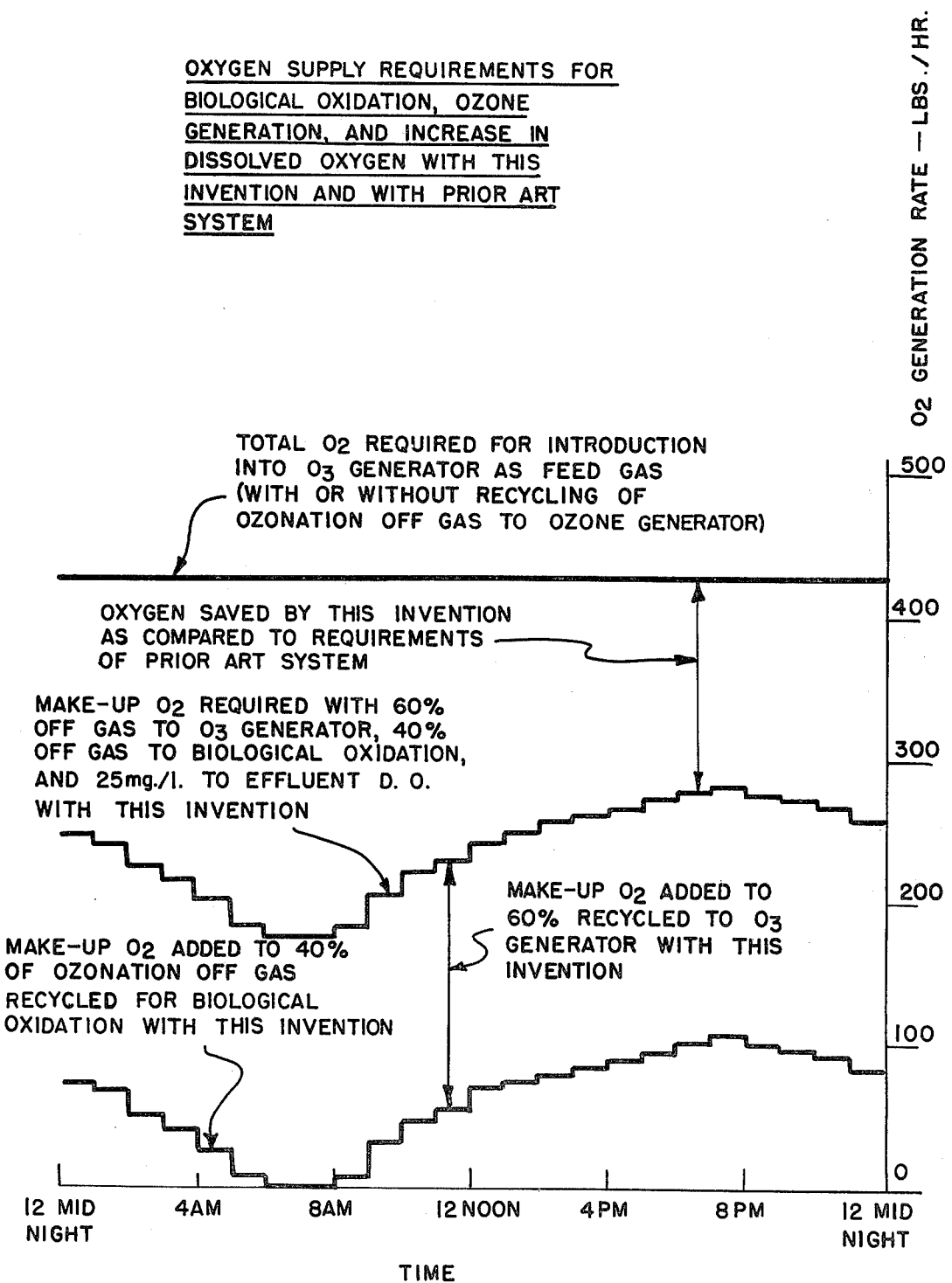
FIG. 9 is a graph of the comparative amounts of oxygen required during a 24-hour period for the respective systems to which FIG. 8 relates.

Comparision of Oxygen Requirements for Equalized Flow With the Present Invention and Prior Art System FIG. 9 shows the oxygen supply requirements for biological oxidation, ozone generation, and increased dissolved oxygen for equalized flow in the situation represented by FIG. 8, both with the method and apparatus of the present invention and with a prior art system.

The upper, straight line graph in FIG. 9 shows the amount of oxygen required for introduction into the ozone generator as feed gas, whether or not there is any recycling of ozonation off gas back to the ozone generator or upstream to the oxygenation stage. As with FIG. 6, the feed gas flowing into the ozone generator is translated into both ozone for disinfection and oxygen carrier gas that provides additional oxygen to increase the dissolved oxygen content of the plant effluent. The increase in dissolved oxygen referred to is 25 mg./l. in the plant effluent.

The upper, straight line graph in FIG. 9 may also be considered to show the oxygen supply requirements for biological oxidation, ozone generation, and increase in dissolved oxygen in a prior art system such as illustrated in FIG. 2.

The two bar graphs in FIG. 9 shows oxygen requirements for a system utilizing the method and apparatus of this invention, in which 60 percent of the off gas from the ozonation tank is recycled to the ozone generator, and the remainder is recycled upstream to the oxygenation tank. The lower bar graph in FIG. 9 shows the oxygen required as make-up gas from the original source of oxygen, to be added to the 40 percent of the ozonation off gas recycled to the oxygenation tank, in order to bring about the necessary biological oxidation in the oxygenation tank. The upper bar graph indicates the oxygen required to be provided as make-up gas by the original oxygen source both for addition to the 60 percent of off gas from the ozonation tank that is returned to the ozone generator, and for addition to the 40 percent of the ozonation off gas that is diverted upstream to the oxygenation tank.

As shown in FIG. 9, the difference between the hourly quantities indicated by the two bar graphs represents the oxygen that must be added to the 60 percent of the ozonation off gas that is recycled to the ozone generator. The difference between the upper, straight line graph and the upper bar graph represents the oxygen saved by the practice of the present invention as compared to the oxygen required in the prior art system described. Once again, the method and apparatus of the present invention provides a very great savings in cost over the prior art system.

VARIOUS EMBODIMENTS OF DRYER

Various types of drying means can be employed with the method and apparatus of this invention. Two-cycle self-purging dryers that use a portion of their own dried output as purge gas to regenerate one-half of the dryer while the other half is in its gas drying cycle are especially useful. When such dryers are used with the present invention, some or all of the ozonation off gas that is not delivered as a recycle component to the ozone generator is utilized as the purge gas.

Heaterless Dryer

One dryer of this type that can be used to advantage is the dryer commonly called a "heaterless dryer." In this type dryer, a small portion of the dry effluent gas at working pressure is expanded to atmospheric pressure, and is passed countercurrently over the dessicant to be regenerated.

Figure 10:
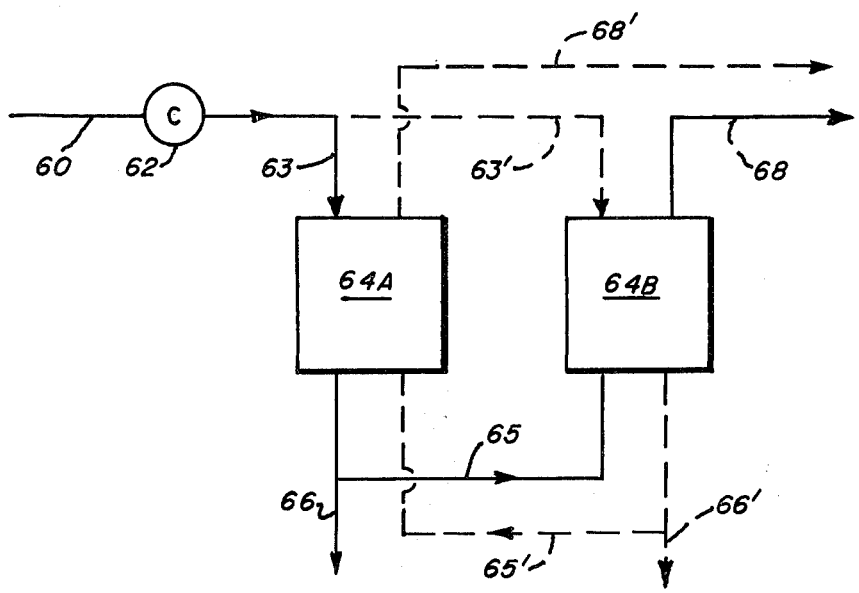
FIG. 10 is a schematic diagram of a two-cycle self-purging heaterless dryer for use in the practice of this invention.

FIG. 10 is a schematic diagram of a heaterless dryer for use in the practice of this invention. Off gas from ozonation tank 46 (FIGS. 1 and 3) enters compressor 62 through conduit 60, and from there flows alternately through one side (for example, 64A) of dryer 64, and then the other side (for example, 64B). Dryer 64 is shown in FIG. 10 in the condition in which the gas to be dried enters side 64A from compressor 62 through circuit 63, while the dessicant in side 64B is being regenerated.

The pressure at which oxygen enriched gas is delivered from original source 24 in FIG. 1 is preferably about 17 p.s.i.g., and ozone generator 52 is preferably operated at a pressure of about 15 p.s.i.g. With these operating conditions, the portion of the dried output of heaterless dryer 64 that is selected as the purge gas for the dryer is selected to be equal to one standard cubic foot per minute for each actual cubic foot per minute of dried gas that is produced by the dryer. As the dried purge gas constituting the selected portion of the ozonation off gas passes through dryer side 64B it dries the dessicant contained therein, to prepare that side to take its turn in drying the ozonation off gas during the following half of the drying cycle of dryer 64.

When the dessicant in dryer side 64A reaches a condition in which it must be regenerated, the wet compressed off gas from compressor 62 is no longer fed into side 64A but is caused to flow through conduit 63' to dryer side 64B, where it is dried. At this time, the portion of the dried off gas from dryer side 64B that is not to be used for purging side 64A flows through conduit 66' to inlet 67 of ozone generator 52. The portion of the dried off gas from dryer 64B that is selected for use as purge gas flows through conduit 65' to dryer side 64A, where it regenerates the dessicant bed of that side before passing out through conduit 68' on its way upstream for recycling to the oxygenation stage of the system.

Split Stream Heat Regenerated Dryer

Figure 11:
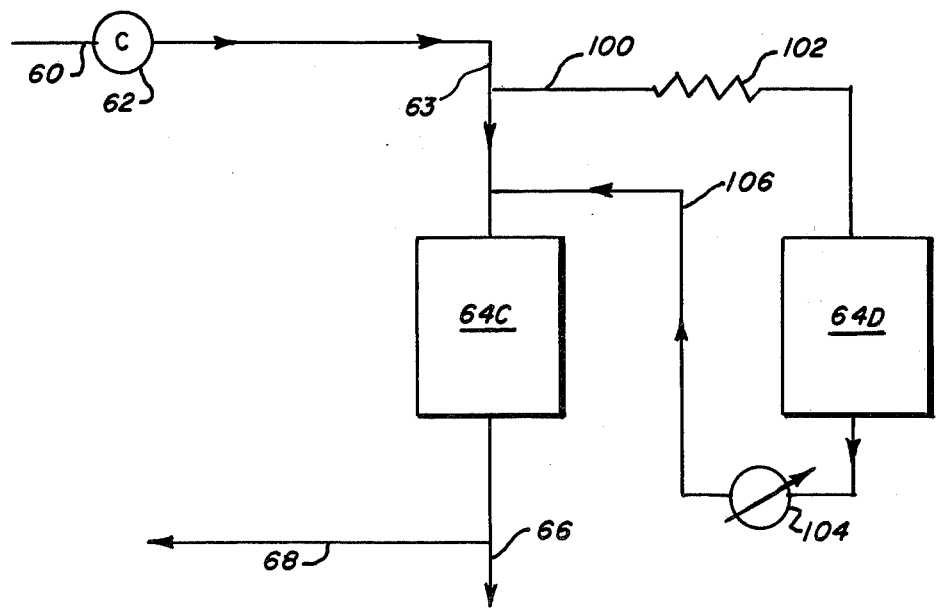
FIG. 11 is a schematic diagram of a split stream heat regenerated dryer for use in the practice of this invention.

Another embodiment of dryer 64 that is useful with the present invention is the type commonly called a "heat regenerated split stream dryer." FIG. 11 illustrates the two halves of 64C and 64D of such a dryer, and shows the communicating conduits and other components for the half of the cycle in which dryer side 64C is in its gas drying phase, while the dessicant bed of 64D is in the process of being regenerated.

In this embodiment, off gas from ozonation tank 46 is flowed to compressor 62. From there a portion flows through 63 directly to dryer 64C.

The remainder of the stream of ozonation off gas splits off through conduit 100 and flows to electric heater 102. The resulting hot gas is introduced into dryer side 64D, where it purges that side's dessicant bed of moisture. This hot gas, containing both its original moisture and moisture purged from dryer side 64D, is cooled by passing it through cooler 104, and is then flowed through conduit 106 to conduit 63 and dryer side 64C. Here it is introduced into side 64C, where it is dried together with the portion that entered 64C directly from conduit 63.

One portion of the ozonation off gas thus dried is flowed from dryer means 64C through conduit 66 to ozone generator 52. Another portion of the dried gas is flowed from dryer 64C through conduit 68 to oxygenation tank 20.

The above detailed description of this invention has been given for clearness of understanding only. No unnecessary limitations should be understood therefrom, as modifications will be obvious to one skilled in the art.

What is claimed is:

1. A method of treating by the activated sludge method aqueous waste material that has a $BOD_5$ of from about 60 parts per million to about 300 parts per million, and contains pathogenic agents such as bacteria and viruses in an amount creating an ozone disinfection demand in the effluent from the oxygen treatment facility of the activated sludge sewage treatment plant of at least about 4 parts per million, and further oxygenating and disinfecting said effluent with oxygen and ozone, which comprises:

introducing said aqueous waste material into an oxygen treatment facility which includes at least one zone in which an oxygen enriched gas is introduced into the aqueous material being treated and at least one settling and clarifying zone;

introducing an oxygen enriched gas through a gas feed conduit into said aqueous waste material in said first mentioned zone, said gas containing at least about 70 percent of oxygen by dry weight;

flowing the contents of said first mentioned zone to said settling and clarifying zone and holding the same there to cause activated sludge to settle out while liquid effluent flows from said settling and clarifying zone;

returning at least a portion of said settled activated sludge to said first mentioned zone into which said oxygen enriched gas is introduced;

thoroughly mixing said aqueous waste material, said oxygen enriched gas, and said return activated sludge in said first mentioned zone to produce mixed liquor containing suspended biomass and inert solid particles;

introducing the liquid effluent from said oxygen treatment facility into a gas-tight ozone contact zone downstream of said facility;

introducing oxygen enriched gas containing at least about 90 percent of oxygen by dry weight from an original source of said gas into an ozone generator the output of which comprises an oxygen enriched gas containing at least about 1 percent of ozone gas by dry weight;

flowing said ozone-containing oxygen enriched gas from said ozone generator into said ozone contact zone;

thoroughly mixing said ozone-containing oxygen enriched gas with the liquid contents of said ozone contact zone to inactivate said pathogenic agents and produce substantially disinfected water for removal as plant effluent from the outlet of said contact zone;

flowing said substantially disinfected water from the outlet of said contact zone;

flowing from said ozone contact zone the excess oxygen enriched gas depleted at least partially of ozone and oxygen;

removing substantially all the mosisture vapor and entrained moisture from at least about 30 percent by dry weight of said excess oxygen enriched gas to dry said portion of gas while leaving the nitrogen and carbon dioxide contained in said gas;

mixing oxygen enriched gas delivered from said original source as make-up gas with dried excess nitrogen- and carbon dioxide-containing oxygen enriched gas, derived as aforesaid from said ozone contact zone, as a recycle component, said recycle component constituting between about 30 percent and about 90 percent by weight of the excess oxygen enriched gas that flows from said ozone contact zone, to introduce said recycle component into said ozone generator together with said make-up gas when the latter is introduced into the generator as aforesaid;

diverting at least a portion of the remainder of said excess oxygen enriched gas from said ozone contact zone to said gas feed conduit of said oxygen treatment facility;

introducing at least a portion of said gas thus diverted into the aqueous material contained in said oxygen treatment facitity; and venting to the atmosphere excess oxygen that remains undissolved in the aqueous material contained in said oxygen treatment facility.

2. The method of treating aqueous waste material of claim 1 in which oxygen enriched gas from said original source is introduced as make-up gas into the aqueous material contained in said oxygen treatment facility.

3. The method of treating aqueous waste material of claim 2 in which said make-up gas and said excess enriched gas diverted from said ozone contact zone to said gas feed conduit of said oxgyen treatment facility are mixed together before being introduced into the aqueous material in said oxygen treatment facility.

4. The method of treating aqueous waste material of claim 1 in which substantially all of said remainder of excess oxygen enriched gas from said ozone contact zone that is diverted to said gas feed conduit of said oxygen treatment facility is introduced into the aqueous material contained in said oxygen treatment facility.

5. The method of treating aqueous waste material of claim 1 in which a portion of said remainder of excess oxgyen enriched gas from said ozone contact zone that is diverted to said gas feed conduit of said oxygen treatment facility is vented directly to the atmosphere without being introduced into said oxygen treatment facility.

6. The method of treating aqueous waste material of claim 1 which includes the steps of sensing the amount of dissolved oxygen in the liquid contents of said oxygen treatment facility and, in response to said dissolved oxygen level as thus determined, adjusting the amount of oxygen enriched gas introduced into said oxygen treatment facility from said original source as make-up gas.

7. The method of treating aqueous waste material of claim 6 in which said adjustment of the amount of make-up oxygen enriched gas introduced into said oxygen treatment facility is effected automatically in response to a change in said dissolved oxygen level as determined by said sensing means.

8. The method of treating aqueous waste material of claim 1 which includes the steps of sensing the amount of dissolved oxygen in the liquid contents of said oxygen treatment facility and, in response to said dissolved oxygen level as thus determined, adjusting the amount of excess oxygen enriched gas from said ozone contact zone that is vented directly to the atmosphere without being introduced into said oxygen treatment facility.

9. The method of treating aqueous waste material of claim 8 in which said adjustment of the amount of excess oxygen enriched gas from said ozone contact zone that is vented directly to the atmosphere is effected automatically in response to a change in said dissolved oxygen level as determined by said sensing means.

10. The method of treating aqueous waste material of claim 1 in which said oxygen treatment facility includes a single zone for introduction of oxygen enriched gas into said aqueous material being treated.

11. The method of treating aqueous waste material of claim 10 in which said single zone for introduction of oxygen enriched gas into said aqueous material being treated is a biological ozidation zone.

12. The method of treating aqueous waste material of claim 10 in which said single zone for introduction of oxygen enriched gas into said aqueous material being treated is a nitrification zone, and said oxygen treatment facility is preceded by a zone in which carbonaceous material is removed from the aqueous waste material being treated without the introduction into said aqueous waste material of any gas containing more than 23 percent oxygen by dry weight.

13. The method of treating aqueous waste material of claim 10 in which said single zone for introduction of oxygen enriched gas into said aqueous material being treated is a combined biological oxidation and nitrificaton zone.

14. The method of treating aqueous waste material of claim 1 in which said oxygen treatment facility includes a biological oxidation zone and a nitrification zone located downstream therefrom, in both of which zones oxygen enriched gas is introduced into the aqueous waste material being treated, each of said zones being followed immediately by a settling and clarifying zone from which activated sludge is returned to the respective zone into which oxygen enriched gas is introduced, and said excess oxygen enriched gas from said ozone contact zone is introduced into both said biological oxidation zone and said nitrification zone.

15. The method of treating aqueous waste material of claim 1 in which substantially all the moisture vapor and entrained moisture is removed from at least about 50 percent by weight of said excess oxygen enriched gas from said ozone contact zone to dry said portion of gas, and said recycle component of dried excess oxygen enriched gas from said contact zone that is mixed with oxygen enriched gas delivered from said original source as make-up gas, and is then delivered to said ozone generator as part of a mixture, constitutes between about 50 percent and about 80 percent by dry weight of all of said excess oxygen enriched gas from said ozone contact zone.

16. The method of treating aqueous waste material of claim 1 in which substantially all the moisture vapor and entrained moisture is removed from at least about 60 percent by weight of said excess oxygen enriched gas from said ozone contact zone to dry said portion of gas, and said recycle component of dried excess oxygen enriched gas from said contact zone that is mixed with oxygen enriched gas delivered from said original source as make-up gas and is then delivered to said ozone generator as part of a mixture, constitutes about 60 percent by dry weight of all of said excess oxygen enriched gas from said ozone contact zone.

17. The method of treating aqueous waste material of claim 1 in which said step of drying excess oxygen enriched gas from said ozone contact zone is carried out by use of a two-cycle self-purging dryer that uses a portion of its own dried output as purge gas to regenerate one half of the dryer while the other half is in its gas drying cycle, and at least some of the portion of said excess oxygen enriched gas from said ozone contact zone that is not delivered as said recycle component to said ozone generator is utilized as said purge gas.

18. The method of treating aqueous waste material of claim 17 in which substantially all of said excess oxygen enriched gas from said ozone contact zone is flowed through said two-cycle self-purging dryer and at least about 10 percent by dry weight of said gas is used as the purge gas for said dryer.

19. The method of treating aqueous waste material of claim 17 in which substantially all of said oxygen enriched gas from said ozone contact zone is flowed through said two-cycle self-purging dryer and at least about 25 percent by dry weight of said gas is used as the purge gas for said dryer.

20. The method of treating aqueous waste materal of claim 17 in which substantially all of said excess oxygen enriched gas from said ozone contact zone is flowed through said two-cycle self-purging dryer and approximately 40 percent by dry weight of said gas is used as the purge gas for said dryer.

21. The method of treating aqueous waste material of claim 17 in which said two-cycle self-purging dryer is a heaterless dryer.

22. The method treating aqueous waste material of claim 18 in which said two-cycle self-purging dryer is a heaterless dryer.

23. The method of treating aqueous waste material of claim 19 in which said two-cycle self-purging dryer is a heaterless dryer.

24. The method of treating aqueous waste material of claim 20 in which said two-cycle self-purging dryer is a heaterless dryer.

25. The method of treating aqueous waste material of claim 17 in which said two-cycle self-purging dryer is a split stream heat regenerated dryer.

26. The method of treating aqueous waste material of claim 21 in which said oxygen enriched gas delivered from an original source of said gas is delivered at a pressure of about 17 p.s.i.g., said ozone generator is operated at a pressure of about 15 p.s.i.g., and the portion of the dried output of said heaterless dryer that is employed as the purge gas for the dryer is equal to one standard cubic foot per minute for each actual cubic foot per minute of dried gas that is produced by said dryer.

* * * * *

UNITED STATES PATENT AND TRADEMARK OFFICE
CERTIFICATE OF CORRECTION

PATENT NO. : 4,132,637
DATED : January 2, 1979
INVENTOR(S) : William Phillip Key, David C. Ihrig and Darrell W. Monroe It is certified that error appears in the above-identified patent and that said Letters Patent are hereby corrected as shown below:

Column 5, line 35, McWhirter Pat. No. should be 3,660,277.

Column 13, line 52, "34" should be --24--.

Column 22, lines 30-31, the spelling of "conduit" should be corrected.

Signed and Sealed this

Eleventh Day of September 1979

[SEAL]

Attest:

LUTRELLE F. PARKER
Attesting Officer    Acting Commissioner of Patents and Trademarks